United States Patent [19]

Koch et al.

[11] Patent Number: 5,076,985

[45] Date of Patent: Dec. 31, 1991

[54] METHOD FOR FORMING CEILING TILE

[75] Inventors: John D. Koch, Greenwood; Mark R. Glassley, Greensburg; Richard N. Cunningham, Greenwood, all of Ind.

[73] Assignee: Knauf Fiber Glass, GmbH, Shelbeyville, Ind.

[21] Appl. No.: 415,584

[22] Filed: Oct. 2, 1989

[51] Int. Cl.[5] .......... B28B 5/04; B28B 11/14; B29C 59/00; D21J 3/00

[52] U.S. Cl. .......... 264/119; 162/226; 162/227; 264/118; 264/120; 264/145; 264/160; 264/162; 264/163; 264/297.7; 264/DIG. 31; 425/219; 425/220

[58] Field of Search .......... 264/112, 115, 118, 119, 264/120, DIG. 31, 145, 160, 162, 163, 297.7, 297.9, 333; 162/222, 223, 225, 226, 227; 425/219, 220

[56] References Cited

U.S. PATENT DOCUMENTS

| | | | |
|---|---|---|---|
| 943,971 | 12/1909 | Hackett | 425/219 |
| 1,206,553 | 11/1916 | Lewis | 264/313 X |
| 1,780,623 | 11/1930 | Loetscher | 162/223 |
| 2,737,997 | 3/1956 | Himmelheber et al. | 264/112 X |
| 2,744,848 | 5/1956 | Mottett | 264/313 X |
| 3,246,063 | 4/1966 | Podgurski . | |
| 4,105,383 | 8/1978 | Hanson | 425/219 X |
| 4,469,656 | 9/1984 | Ishii | 264/119 X |
| 4,666,648 | 5/1987 | Brittain | 264/145 |
| 4,675,144 | 6/1987 | Hammond | 264/118 X |
| 4,758,148 | 7/1988 | Jidell | 425/219 |

*Primary Examiner*—Jan H. Silbaugh
*Assistant Examiner*—Karen Aftergut
*Attorney, Agent, or Firm*—Baker & McKenzie

[57] ABSTRACT

A process for consistently making ceiling tiles having uniform density and surface texture includes using a conveyor along which trays are moved in a generally horizontal direction. A feeder box is used to deposit pulp in the trays, the pulp being comprised of a mixture of water, starch, fibrous material, and other ingredients. The feeder box through which pulp is deposited in the trays is of a special design, and includes a sloping front edge which creates a negative rake angle with respect to layers produced by the system. The lower front edge of the feeder box includes a surface having a compound curvature. Ceiling tiles are produced by the process having improved uniformity of density and surface texture.

3 Claims, 1 Drawing Sheet

METHOD FOR FORMING CEILING TILE

BACKGROUND AND SUMMARY OF THE INVENTION

This invention relates to a method and apparatus for making acoustical tile utilized primarily in ceiling construction. In particular, the method and apparatus for this invention produce an improved cast ceiling tile which has uniformity of density.

While a large variety of formulations may be used, cast ceiling tiles are generally made with a combination of fiber material and a binder, preferably a starch binder. An example of a typical prior art process is shown and described in U.S. Pat. No. 3,246,063 (the '063 patent). The '063 patent describes a process in which a composition of granulated mineral wool and a binder is deposited in a tray which has been lined with a foil sheet. The binder of the '063 patent is an amylaceous starch which, when mixed with water and mineral granulated wool, is placed on a tray in a layer. The composition is subsequently leveled with a reciprocating screed bar. The composition is then oven-dried into slabs and cut into tiles.

A substantial difficulty with the process shown in the '063 patent relates to the density of the final product. Density is an important consideration from the standpoint of structural integrity and strength, and because of thermal and acoustical considerations. The problem of achieving a uniform density relates to the manner in which the uncured composition is deposited in trays. A quantity of fluid uncured mixture is poured into a box which has an open bottom. Trays are placed on a conveyor and moved horizontally under the box. Generally, the opening of the bottom of the box is approximately the same width as the tray. When the tray moves past the opening in the box, the fluidized mixture or pulp fills the tray, and one edge of the box scrapes the surface of the filled tray to a given height. However, at the outside edges of the tray, the flow of pulp is inhibited by frictional contact with the sides of the box which are parallel to the direction of movement of the tray. The slower flow of pulp at the edges creates openings or fissures in the pulp as the tray moves out from under the box. Such fissures and open areas tend to weaken the outer edges of the tiles. The resulting inconsistencies in density have consequences which relate to the machinability, as well as the appearance of the tiles. Inconsistency in tile density may also have consequences relating to the porosity of the tile, which may be important in applications where ventilation systems rely on the tile material to direct air flow.

A wide variety of formulations can be used to manufacture starch-based ceiling tiles. Consistency of the tile material is extremely important, primarily because the tiles must have a uniform surface texture. Even minor variations in surface texture may be obvious from tile to tile, making a ceiling unattractive.

It is an object of the present invention to provide a method for producing ceiling tiles which have uniform density.

It is another object of the present invention to provide an apparatus for making ceiling tiles with uniform density.

It is a further object of the present invention to provide a method for making ceiling tiles with uniform surface texture.

Another object of the present invention is to provide an apparatus for making ceiling tiles which have uniform surface texture.

Yet another object of the present invention is to provide a machine and method for depositing a layer of pulp so that when it is shaped and subsequently rolled with a roller, the layer has a substantially uniform density.

Still a further object of the present invention is to provide a ceiling tile which has uniformity of both density and texture.

These and other objects of the present invention are achieved with an apparatus in which a conveyor is used to carry a series of trays underneath a pulp feeder box. The trays may, or may not, be lined with a flexible backing. As the trays move underneath the feeder box, pulp comprised of an aqueous mixture of starch and fibrous material is deposited in the trays. Because the upper exposed surface of the pulp layer will eventually be the visible surface of the ceiling tile, formation of the pulp surface layer is critical. In the apparatus of the present invention, the layer is deposited in the trays in an uneven configuration with outer edges being thicker than inner portions of the layer. This uneven layer is formed with a curved edge on the bottom of the feeder box. A roller is then used to level the layer, providing it with a substantially uniform density and surface texture. The slabs are then hardened by baking. The hardened slabs are then cut and finished in accordance with known techniques. It should be noted that the by-products of finishing the slabs into tiles can be used and reclaimed by including them in subsequent batches of pulp.

BRIEF DESCRIPTION OF THE DRAWINGS

A more complete understanding of the invention will be obtained by reading the following specification, in conjunction with the attached drawings, wherein.

DETAILED DESCRIPTION OF THE INVENTION

Figures 1, 2, 3:
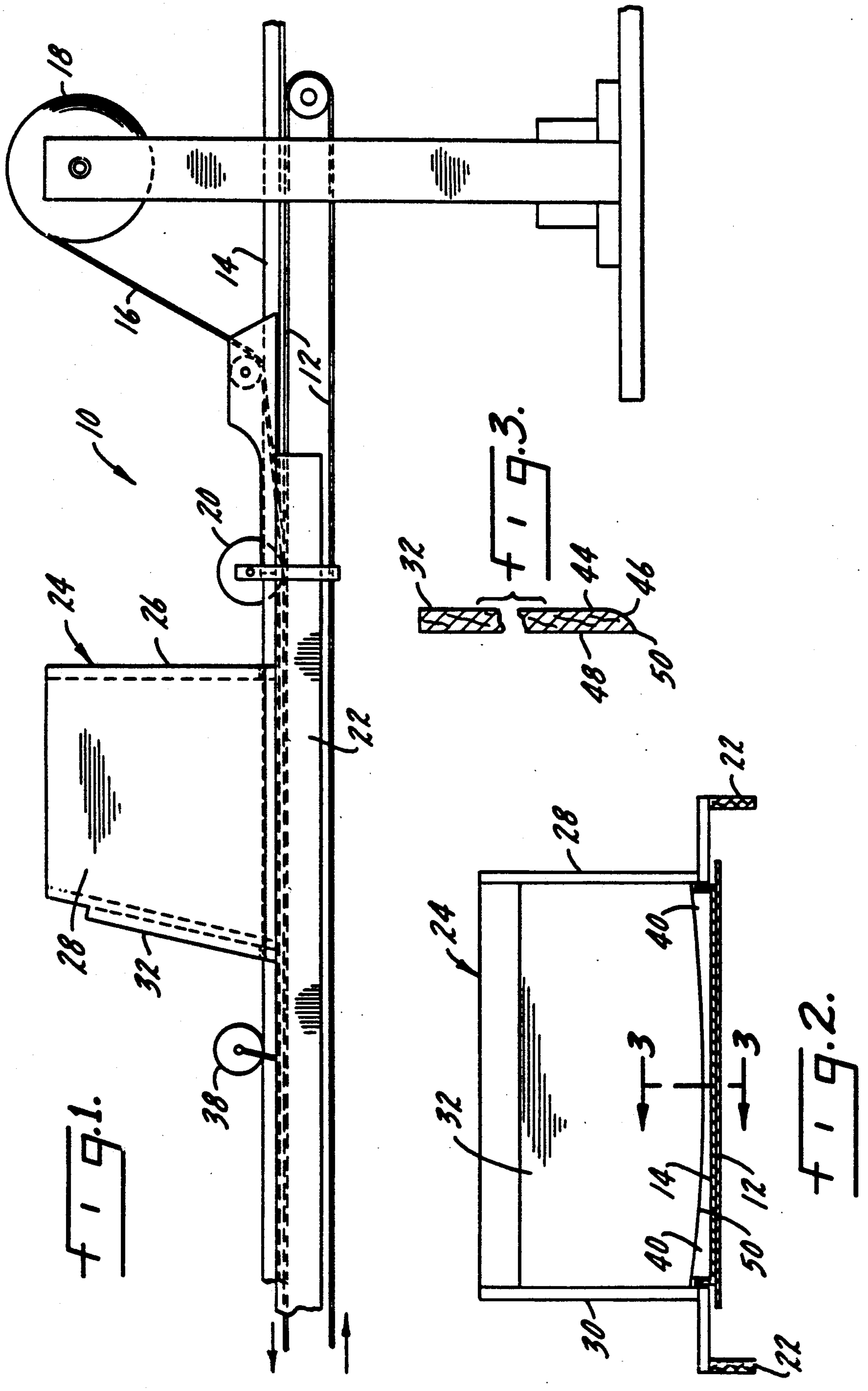
FIG. 1 is an elevational view of a conveyor and feeder box constructed in accordance with the present invention.
FIG. 2 is a front elevational view of the feeder box shown in FIG. 1.
FIG. 3 is a sectional view of the lower front edge of the feeder box shown in FIG. 2, taken along line 3—3 of FIG. 2.

FIG. 1 is an elevational view in partial section of the slab-forming apparatus of the present invention. As used in this application, the word "slab" is intended to refer to a layer of uncured pulp, which when cured may be cut into tiles. The apparatus 10 includes a conveyor belt 12 for carrying a tray 14 in a generally horizontal direction. Tile backing (paper, foil, or a combination thereof) 16 is fed from a roll 18 into the tray 14. A roller 20 presses the backing into the tray 14. The roller 20 is mounted to the conveyor support 22. The direction of movement of the conveyor belt 12 is shown with arrows in FIG. 1. The upper conveying section of the belt 12 moves the trays 14 to the left as viewed in FIG. 1. Trays 14 lined with backing 16 are moved by the conveyor belt 12 underneath a feeder box 24, which is carried by the support member 22. The feeder box 24 is open on both its top and bottom. The box 24 has three sides 26, 28 and 30 (see FIGS. 1 and 2) which are generally vertical. The fourth side 32 is at an angle relative to the movement of the conveyor belt 12. An aqueous mixture of cooked starch and fibrous material is placed in the feeder box 24. As the conveyor moves the trays under the feeder box, the pulp is deposited in the trays, and the lower edge 50 of the front 32 forms the upper surface of the pulp layer.

As can be seen clearly in FIG. 2, the lower edge 50 is curved so that outer edges of the pulp layer are thicker than the center or inner portion thereof. Referring again to FIG. 1, the texturizing roller 38 levels the layer by compressing the pulp which has been deposited in the outer edges 40 of the tray.

Because the pulp frictionally engages the sides 28 and 30 as it exits the box 24, separations in the pulp layer tend to occur at the outer edges. By depositing the pulp layer in the configuration shown in FIG. 2, and by subsequently rolling the pulp layer with the roller 38, a pulp layer which is substantially uniform in density and surface texture is produced.

FIG. 1 shows a section through the lower edge 50. Inner and outer surfaces, 44 and 48 respectively, of the front 32 converge at the bottom edge 50. The convergence arises because the inner surface 44 has a curved extension 46 which meets with the substantially straight outer surface 48. The curved extension 46, together with the lateral curvature thereof, shown in FIG. 2, provide the lower end of the front 32 with a compound curvature. Such compound curvature tends to produce a layer of pulp which when rolled with a roller 38 has excellent consistency of surface texture and density.

The positive rake angle provided by the sloping front 32 relative to the layer further enhances the consistency of the product produced by the present invention. The angle of the front 32, preferably between about 3° to about 15° from vertical, results in a slight compression of the pulp as it exits the bottom of the feeder box 24. In order to produce a consistent product using the feeder box of the present invention, it is important to maintain an approximately constant level of pulp in the box 24. The amount of hydrostatic pressure at the point of exit from the feeder box has a significant effect on the consistency of the pulp layer.

The forming operation is critical. The height of the lower edge 50, shown in FIG. 2, should be at an elevation which allows enough pulp to exit the box into the tray so that when the roller 38 rides across the pulp layer, the roller is completely supported by pulp, and not by the edges of the tray. By preventing interference between the roller 38 and the trays, the consistency of the pulp layer is better assured. Such interference may also be reduced by making the length of the roller slightly less than the distance between upward edges of the trays.

The inside of the feeder box 24 and the outside of the roller 38 may be sprayed with a lubricant such as TRI-FLOW lubricant made by Thomson & Formby, to prevent pulp from sticking to such components. The conveyor should never be stopped and should be run at a constant speed, which speed will depend upon the consistency of the mix being processed. The speed of the conveyor is controlled with a variable controller so that adjustments to the speed can be made in order to arrive at the proper constant operating speed. The speed should be adjusted while observing slabs being formed so as to avoid creating large tears or fissures at the outer edges thereof. Once the trays are filled with pulp, they should be handled carefully to avoid bumps which can cause changes in surface texture.

The filled trays are placed in ovens to cause the pulp to dry and harden. After the slabs have dried, they are cut into tiles, painted and packaged, using known techniques. The by-products of planing, edging and sawing may be collected and recycled.

The variables which control the output of the system of the present invention include the formulation used, the speed at which the conveyor moves the trays, the level of pulp in the feeder box, the height of the front edge 50, the height, weight and diameter of the roller 38, and handling and drying procedures. Other factors such as the kind of backing used, and the atmospheric conditions also effect the final product, but to a lesser extent than those outlined above. It must be recognized that, as with many manufacturing processes, a certain degree of skill must be developed in order to properly control the many variables which effect the end product.

The present invention has several advantages. One of these advantages is that the invention allows the formation of ceiling tiles which are uniform in density. By forming slabs which are initially thicker at the outer edges thereof, there is compensation for the separation of the mixture at the outer edges which is associated with frictional forces between the mixture and the side walls of the feeder box. The use of a roller to press and densify the raised edges results in a superior quality of tile. The curved lower edge of the feeder box promotes the formation of a consistent surface texture, and the roller can be used to selectively modify the surface texture.

While the invention as been described with respect to a particular embodiment, it should be recognized that many variations, modifications, and alternatives can be made to the described embodiment without departing from the spirit and scope of the appended claims.

I claim:

1. A process for manufacturing ceiling tile comprising the steps of:

preparing a mixture which includes water, a binder and fibrous material;

loading said mixture into a feeder box having edges, passing a tray under said feeder box and feeding said mixture into said tray from said feeder box while forming an initially uneven layer of said mixture in said tray, said uneven layer being formed so that it is thicker at its outer edges than at its central portion, slower flow of said mixture at said edges of said feeder box creating openings and fissures in said layer at its outer edges, leveling said uneven layer with a roller which compresses said mixture at said outer edges to a density which is generally equal to the density of said mixture at said central portion, then causing said layer of said mixture to harden into a slab, and finishing said slab to form said ceiling tile,

2. A process for the manufacture of ceiling tile in accordance with claim 1 wherein:

texture in provided to an upper surface of said layer with said roller.

3. A process for manufacturing ceiling tile in accordance with claim 1 wherein a plurality of trays are passed under said feeder box to thereby form a plurality of ceiling tiles by said process steps.

* * * * *